United States Patent [19]

Eriguchi et al.

[11] Patent Number: 5,491,386
[45] Date of Patent: Feb. 13, 1996

[54] STABLE HIGH FREQUENCY HIGH-PRESSURE DISCHARGE LAMP LIGHTING DEVICE AVOIDING ACOUSTIC RESONANCE

[75] Inventors: Hiroyasu Eriguchi; Hiroshi Nishimura; Minoru Yamamoto; Yutaka Iwahori; Takeshi Kamoi, all of Kadoma, Japan

[73] Assignee: Matsushita Electric Works, Ltd., Osaka, Japan

[21] Appl. No.: 277,023

[22] Filed: Jul. 19, 1994

[30] Foreign Application Priority Data

Feb. 15, 1994 [JP] Japan .................................. 6-018733

[51] Int. Cl.[6] .................................................. H05B 37/02
[52] U.S. Cl. ..................... 315/209 R; 315/307; 315/224; 315/DIG. 5
[58] Field of Search ..................... 315/307, 224, 315/209 R, DIG. 5, DIG. 7, 308, 244, 105, 106

[56] References Cited

U.S. PATENT DOCUMENTS

| | | | |
|---|---|---|---|
| 4,868,463 | 9/1989 | Dorleijn et al. | 315/326 |
| 4,935,669 | 6/1990 | Nilssen | 315/105 |
| 4,952,849 | 8/1990 | Fellows et al. | 315/307 |
| 5,233,273 | 8/1993 | Waki et al. | 315/224 |

Primary Examiner—Robert J. Pascal
Assistant Examiner—David H. Vu
Attorney, Agent, or Firm—Leydig, Voit & Mayer

[57] ABSTRACT

A lighting device for a high-pressure discharge lamp includes an inverter circuit for converting a DC voltage into an AC voltage using a pair of switching elements. The switching elements have a switching frequency for starting the high-pressure discharge lamp that is higher than a resonance frequency of a series resonance circuit connected in parallel with the discharge lamp. However, in a lighted state of the discharge lamp, the switching frequency is lower than the resonance frequency of the resonance circuit and is within a frequency range where acoustic resonance does not occur. The lighted state of the high-pressure discharge lamp is maintained by a voltage across a capacitor in the series resonance circuit.

10 Claims, 11 Drawing Sheets

STABLE HIGH FREQUENCY HIGH-PRESSURE DISCHARGE LAMP LIGHTING DEVICE AVOIDING ACOUSTIC RESONANCE

BACKGROUND OF THE INVENTION

This invention relates to a device for starting and lighting a high-pressure discharge lamp.

The device of the type referred to is useful in starting and lighting in smooth manner such high-pressure discharge lamp as a mercury-arc lamp, sodium vapor lamp, metal halide lamp or the like.

DESCRIPTION OF RELATED ART

For the high-pressure discharge lamp lighting device, there have been generally employed a rectangular-wave lighting device for example, in which, briefly speaking, a DC chopper circuit including a switching means is connected to a DC power source, a polarity inverting circuit which operates at a low frequency is connected to output end of the DC chopper circuit, and a high-pressure discharge lamp is connected to output end of the DC chopper circuit through a filter circuit comprising an inductance element and a capacitor. In this case, a DC power supplied from the DC power source is subjected to a chopping by means of an operation of the switching means in the DC chopper circuit, and an output of the DC chopper circuit is alternated at a low frequency of, for example, about 100 to 400 Hz, by the polarity inverting circuit. Further, a high frequency component in this output of the polarity inverting circuit is bypassed by the filter circuit, while a rectangular wave current of a low frequency component is supplied to the high-pressure discharge lamp, and whereby the rectangular wave lighting of the high-pressure discharge lamp is carried out by this lighting device.

In this case, the high-pressure discharge lamp requires that a high voltage is applied thereto upon being started. In a lamp lighting circuit, for example, the arrangement is so made that a pulse output of a pulse generating circuit is boosted at a pulse transformer to be converted into a high voltage pulse, and this high voltage pulse is applied to the high-pressure discharge lamp for its positive starting. With this arrangement, however, a variety of such circuit parts as switching means, inductance element, capacitor, pulse transformer and the like which are relatively large in size are required, and a problem has been left unsolved in that the device has to be enlarged as a whole and to be made high in manufacturing costs.

In U.S. Pat. No. 4,952,849, on the other hand, there has been disclosed a lamp lighting device of a high frequency lighting system, in which the inverter circuit comprises a high frequency inverter, and an AC power is directly supplied to the fluorescent lamp in the load circuit, with which high frequency lighting system the parts apt to enlarge the device size can be reduced, and the device as a whole can be minimized in size and costs. In supplying the high frequency power to the high-pressure discharge lamp, however, there arises a problem that an acoustic resonance is caused to occur, discharge arc generation is unstable, so that a flicker-off and damage of the lamp itself will be likely to occur.

Further, in U.S. Pat. No. 4,868,463, there has been suggested a measure for effectively avoiding the acoustic resonance occurring when the high frequency lighting is carried out. Since in this case a high voltage is generally required to be applied to the high pressure discharge lamp upon starting the same, it has been necessary that, depending on the type of the lighting device, the device is provided with two operating states of a starting operation in which the high voltage is applied to the high pressure discharge lamp and a lighting operation in which the high pressure discharge lamp is stably lighted, while smoothly realizing these operations is series from the starting to the stable lighting. With the measure suggested in this U.S. patent, the acoustic resonance occurring upon the high frequency lighting may be avoided, whereas the smooth realization of the operations from the starting to the stable lighting has not been sufficiently considered as a problem to be solved but has been still left as an unsolved task.

SUMMARY OF THE INVENTION

A primary object of the present invention is, therefore, to provide a high-pressure discharge lamp lighting device which can overcome the foregoing problems and is, in addition to the avoidance of the acoustic resonance upon the high frequency lighting, capable of achieving the smooth realization of the sequential operation from the starting to the stable lighting of the high-pressure discharge lamp and still rendering such device to be minimized in the size and in manufacturing costs.

The above object of the present invention can be realized by means of a high-pressure discharge lamp lighting device in which an inverter circuit is connected to a DC power source for converting a DC source power into an AC power through turning ON/OFF of at least a pair of switching elements, a series resonance circuit of an inductance element and a capacitor is connected to the inverter circuit, a high-pressure discharge lamp is connected in parallel to the capacitor in this series resonance circuit, means for detecting lighting state of the high-pressure discharge lamp is connected to the lamp, and a control circuit is connected to the inverter circuit for changing over the switching frequency of the switching elements in the inverter circuit in lighted state of the high pressure discharge lamp and in non-load state, characterized in that, when the series resonance circuit is made to have a resonance frequency of $f_R$, the switching frequency of the inverter circuit at the time when the high-pressure discharge lamp is in the non-load state is set by the control means for the switching elements to be a frequency $f_0$ higher than the resonance frequency $f_R$ of the series resonance circuit but close to the resonance frequency $f_R$, the high-pressure discharge lamp is provided for being startable with a high voltage generated across the capacitor in the series resonance circuit, the switching frequency of the inverter circuit at the time when the high-pressure discharge lamp is lighted ON is set at a resonance frequency $f_1$ lower than the resonance frequency $f_R$ of the series resonance circuit but causing no unstable arc discharge due to the acoustic resonance to occur, and the lighting of the high-pressure discharge lamp is maintained with the voltage generated across the capacitor in the series resonance circuit.

Other objects and advantages of the present invention shall become clear as following description of the invention advances as detailed with reference to preferred embodiments of the invention shown in accompanying drawings.

While the present invention shall now be described with reference to the respective embodiments shown in the drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Figure 1:
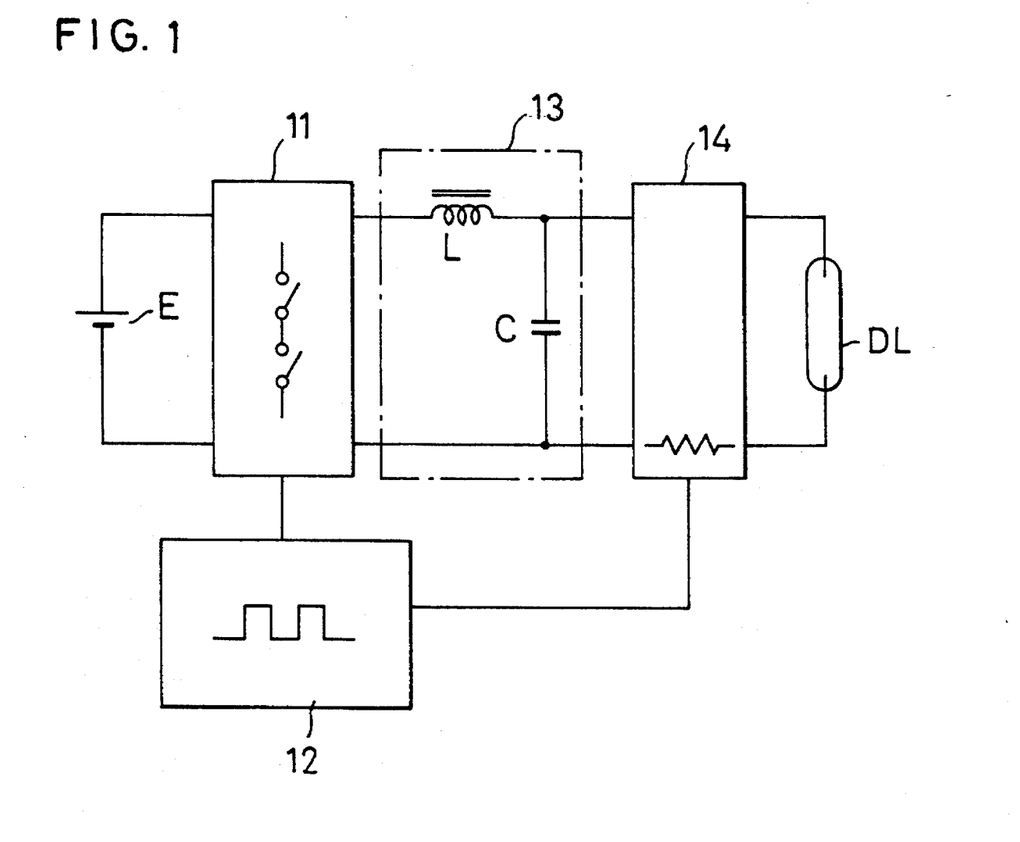
FIG. 1 is a schematic block diagram showing an embodiment of the high-pressure discharge lamp lighting device according to the present invention.

Referring to FIG. 1, there is shown an embodiment of the high-pressure discharge lamp lighting device according to the present invention, in which an inverter circuit 11 is connected to a DC power source E, so that a DC source Dower will be converted into an AC power to be provided to a following stage circuit by properly turning ON and OFF at least a pair of switching elements provided in the inverter circuit 11. Further, this inverter circuit 11 is provided to receive an output of a switching control means 12, and is connected to a resonance circuit 13 comprising a series connection of an inductor L as an inductance element and a capacitor C. Further, in parallel to the capacitor C in the series resonance circuit 13, a high-pressure discharge lamp DL and means 14 for detecting lighted ON/OFF state of the discharge lamp DL are connected, a detection output of which means 14 is provided to the switching control means 12 to be contributive to the setting of switching frequency at the control means 12.

When in this case the resonance frequency of the series resonance circuit 13 is given as $f_R$, the switching control means 12 is so arranged as to set the switching frequency of the inverter circuit 11 at the time when the high-pressure discharge lamp is lighted OFF to be at a frequency $f_0$ which is higher than the resonance frequency $f_R$ of the series resonance 13 but is close to the resonance frequency $f_R$, and to be capable of starting the high-pressure discharge lamp DL at a high voltage generated across the capacitor C in the series resonance circuit 13. Further, the switching control means 12 is also so arranged as to set the switching frequency of the inverter circuit 11 at the time when the high-pressure discharge lamp is lighted ON to be at a frequency $f_1$ which is lower than the resonance frequency $f_R$ of the series resonance circuit 13 but in a range in which any unstable arc discharge due to the acoustic resonance substantially does not take place, and to be capable of maintaining the lighted state of the high-pressure discharge lamp with the high voltage generated across the capacitor C in the series resonance circuit 13.

Figures 2, 2B:
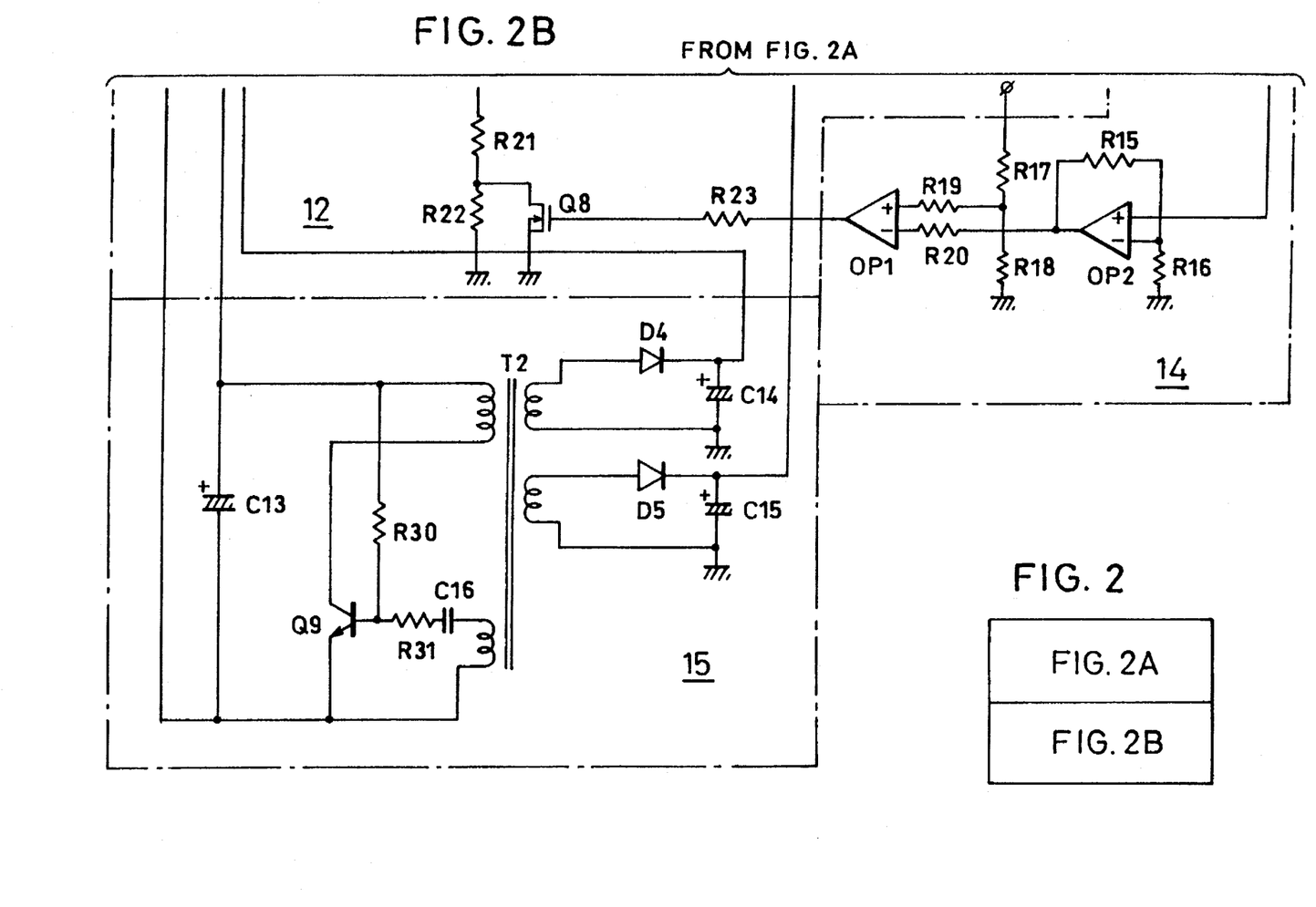
FIGS. 2A and 2B are circuit diagrams which, when viewed in combination as FIG. 2, show detailed circuit diagrams of the lighting device shown in FIG. 1.
Figure 2A:
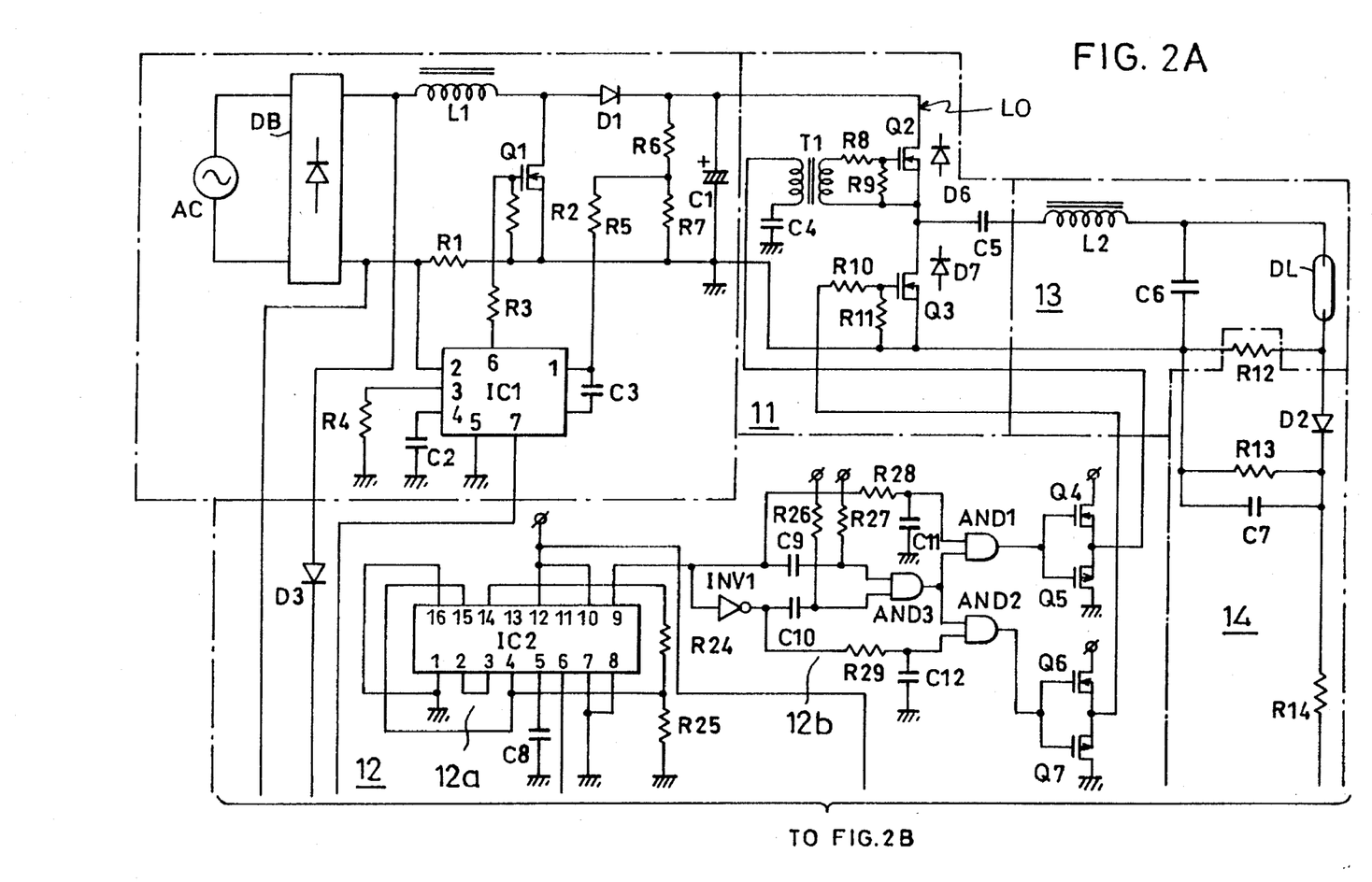

In FIG. 2, there is shown a more detailed circuit diagram of the high-pressure discharge lamp lighting device of FIG. 1, in which circuit portions corresponding to the constituent elements shown in FIG. 1 are respectively shown as enclosed by dotted lines and as denoted by the same reference numerals as those used in FIG. 1. Referring further to the operation at main portions in the circuit of FIG. 2, the DC power supplied from the DC power source E is converted into a high frequency power as passed through a lighting drive section LO in the inverter circuit 11, and this high frequency power is provided through the series resonance circuit 13 to the high-pressure discharge lamp DL to have the lamp started and lighted ON. For the DC power source E in this case, such boosting chopper circuit that provides a DC power from an AC power received from a commercial AC power source AC may be employed. For a control means IC1 of this boosting chopper circuit as the DC power source E, a UC3852 manufactured by a firm UNITRODE is used. At this time, the power to the control means IC1 is supplied from a control power source 15 of RRC system. With the use of the boosting chopper circuit as the DC power source E, it is made advantageous in that a high power factor can be obtained, and an output voltage capable of coping with any higher harmonic distortion and being stable with respect to any fluctuation in the input voltage and the load is also made obtainable.

Further, the lighting drive section LO is provided as a modified half bridge, in which switching elements Q2 and Q3 are connected in series to output end of the DC power source E, and the series resonance circuit 13 comprising inductor L2 and capacitor C6 is connected in parallel to the switching element Q3 through a DC cutting capacitor C5. For the switching elements Q2 and Q3, the use of MOSFET is shown as an example, but it is also possible to employ a transistor and the like to which a diode is connected in reverse parallel. When MOSFET is employed, on the other hand, there exists a parasitic diode which performs the same function as the diode connected in reverse parallel to the transistor, and it is not required to connect any separate diode.

For the inverter circuit 11 including the lighting drive section LO, there is employed a separately excited type in which the switching elements Q2 and Q3 are alternately turned ON and OFF by the control circuit 12. Here, the control circuit 12 comprises an oscillator section 12a and a signal distributing section 12b, in which the oscillator section 12a employs as a control means IC2 an MB3769A manufactured by a firm FUJITSU, and ON/OFF signals of a duty ratio of about 50% of a frequency determined by a capacity of a capacitor C8 connected to #5 pin of the control means IC2 and resistors R21 and R22 connected to #6 pin also of the control means IC2 are provided out of #9 pin. Provided here that the capacitor C8 connected to #5 pin is not variable but is of a constant capacity, the frequency is made lower when the resistance value of the resistors R21 and R22 connected to #6 pin is increased. At the signal distributing section 12b, the ON/OFF signals provided from the oscillator section 12a at the duty ratio of about 50% are so distributed to the switching elements Q2 and Q3 that these elements will be alternately turned ON and OFF. A power to the control circuit 12 is also supplied from the foregoing RCC type control power source 15. At this time, the source potential of -the switching element Q2 varies in response to the ON and OFF operation of the other switching element Q3, and the control signals for the ON and OFF operation of the switching element Q2 are so constituted as to perform a level shift through a driving transformer T1 and a capacitor C4 connected directly to a primary winding of this transformer T1.

Further, in the inverter circuit 11, upon turning ON of the switching element Q2, a current is caused to flow -through a loop from the DC power source E through the switching element Q2, capacitor C5, inductor L2, capacitor C6, high-pressure discharge lamp DL and resistor R12 and back to the DC power source E. Upon turning ON of the switching element Q3, with the capacitor C5 which is substantially in fully charged state made as a power source, a current in a direction inverse to that when the switching element Q2 is ON is caused to flow through a loop from the capacitor C5 through the switching element Q3, capacitor C6, high-pressure discharge lamp DL, resistor R12 and inductor L2 and back to the capacitor C5. Thus, by repeating the ON and OFF operation of these switching elements Q2 and Q3, a high frequency power is to be supplied to the high-pressure discharge lamp DL. In the arrangement referred to, the parasitic diodes D6 and D7 of the switching elements Q2 and Q3 are to perform an action of restoring the energy accumulated in the inductor L2 by means of the above referred currents.

Figure 3:
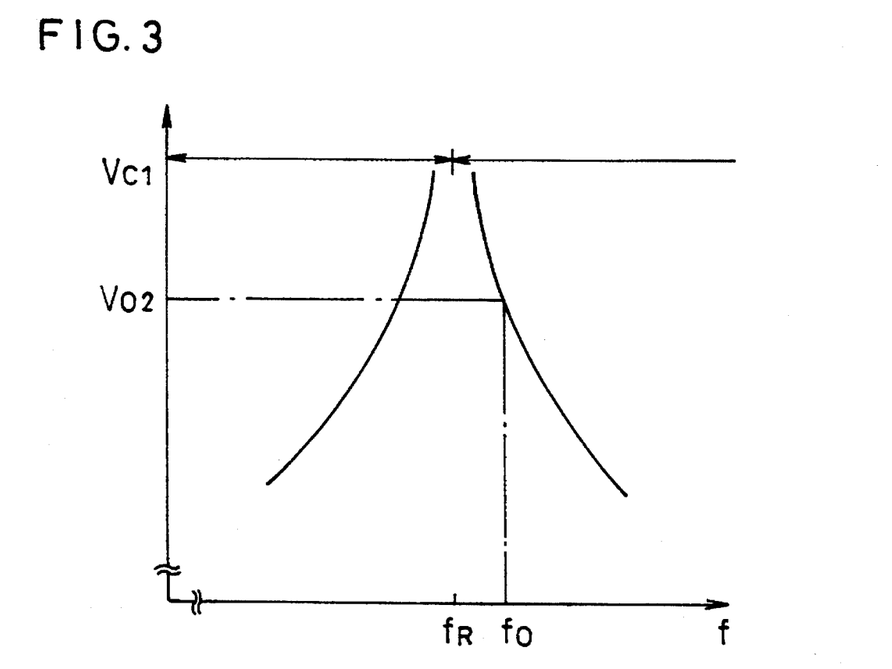
FIG. 3 is a graph for explaining the switching frequency of the lighting device shown in FIG. 1.

In the high-pressure discharge lamp lighting device of the foregoing arrangement, the switching elements Q2 and Q3 are turned ON and OFF at a switching frequency which is close to a resonance frequency of the series resonance circuit 13 comprising the inductor L2 and the capacitor C6 at such time when the high-pressure discharge lamp DL is in unlighted state as the starting state of the lamp, so as to generate a high voltage across the capacitor C6 to have the lamp DL started by such high voltage. After the starting, the difference in the switching frequency of the switching elements Q2 and Q3 from the resonance frequency of the series resonance circuit 13 is made larger, to have the high-pressure discharge lamp DL kept in the lighted state. When at this time the switching frequency of the switching elements Q2 and Q3 is set at a frequency lower than the series resonance circuit 13, that is, at a frequency within such capacitive oscillation range as shown in FIG. 3, a stress applied to the switching elements Q2 and Q3 or to constituent elements of the series resonance circuit 13 is caused to be larger, while such state is referred to as an advance phase mode. On the other hand, the switching frequency of the switching elements Q2 and Q3 is set to be higher than the resonance frequency of the series resonance circuit 13, that is, to be within an inductive oscillation range. At this time, a current delayed in the phase with respect to a phase of the voltage is caused to flow, which operating state being referred to as a delayed phase mode, and the inverter circuit 11 is placed in the operating state of the delayed phase mode also in the present embodiment.

Here, it is required to detect the lighted and unlighted states of the high-pressure discharge lamp DL, for the purpose of changing over the switching frequency of the switching elements in response to the lighting ON and OFF of the lamp DL, as has been referred to in the above. In the present embodiment, therefore, a lamp current detecting circuit is connected as the ON/OFF state detecting means 14 across the capacitor C6 and in series with the high-pressure discharge lamp DL, as shown in FIG. 2. In this lamp current detecting circuit 14, the current flowing through the high-pressure discharge lamp DL, that is, the lamp current is detected to determine if the lamp DL is in the lighted state or not, an output of this detecting circuit 14 denoting the lighted or unlighted state of the lamp DL as a result of the detection by the circuit 14 is provided to the control circuit 12, and the switching frequency of the switching elements Q2 and Q3 is controlled as has been described in accordance with the lighted or unlighted state of the lamp DL.

Next, references shall be made with respect to the switching frequency $f_0$ of the switching elements Q2 and Q3 in the unlighted state of the high-pressure discharge lamp DL, the switching frequency $f_1$ of the elements in the lighted state of the lamp, and the inductor L2 and capacitor C6 forming the series resonance circuit 13. The switching frequency $f_1$ for the switching elements Q2 and Q3 in the lighted state of the lamp DL is set at the possible highest frequency at which the discharge arc is not made unstable due to the acoustic resonance but the lamp DL can be stably lighted ON. Further, the device is operated with the switching frequency fixed substantially at such high frequency $f_1$ for a period from a state in which the lamp DL immediately after the starting and generally in short-circuited state over to a generally stably lighted state. By keeping thus the high switching frequency $f_1$ in the period from immediately after the starting of the high-pressure discharge lamp DL to the substantially stably lighted state reached (which period shall be hereinafter referred to as a "starting course"), it is no more required to control the switching frequency by means of a measure for supervising the lighting state of the lamp in the starting course, and the device can be simplified in the relevant circuit arrangement.

Further, in the high-pressure discharge lamp lighting device of the inverter type of the kind referred to, while not shown in FIG. 2, it is generally required to provide a noise preventing filter for preventing the high frequency component generated at the lighting drive section LO from leaking to the AC power source AC, the keeping of the switching frequency not to vary in the starting course according to the present embodiment as in the above renders the noise preventing filter to be no more necessary but the setting of the frequency characteristics of the device as well as any measure for coping with any radiating noise to be easier.

Figure 4:
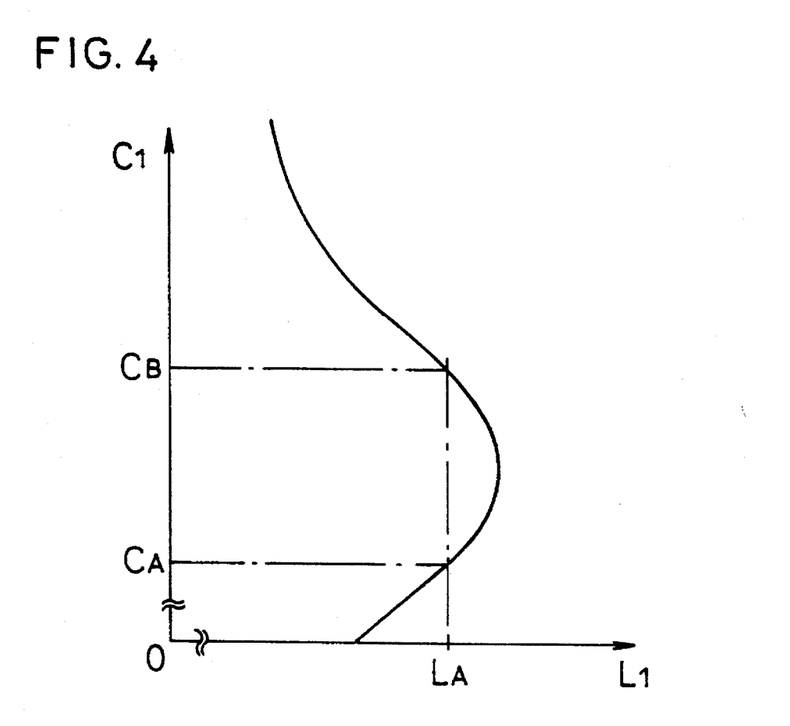
FIG. 4 is a graph representing a setting state of the series resonance circuit in the lighting device of FIG. 1.

In FIG. 4, a setting state of the inductor L2 and capacitor C6 constituting the series resonance circuit capable of supplying concurrently a rated lamp power, rated lamp voltage and rated lamp current to the high-pressure discharge lamp DL in the case of the voltage $V_{DC}$ of the DC power source E and of the switching frequency $f_1$ in the lighted state. Upon starting the high-pressure discharge lamp DL, the lamp current flowing through the lamp DL immediately after the starting and substantially in short-circuited state (which lamp current shall be hereinafter referred to as "short-circuit current") is made to be more than the rated lamp current, for example, 1.2 to 1.8 times as large as the rated current so that the starting of the high-pressure discharge lamp DL can be reliably realized and the flux of light can be made to promptly rise. In setting the short-circuit current as in the above, the setting is to be made only by means of the value $L_A$ of the inductor L2.

The high-pressure discharge lamp DL requires a high voltage for being started, and the switching frequency $f_0$ for alternately turning ON and OFF the switching elements Q2 and Q3 upon lighting OFF the lamp DL is set, within the inductive oscillation zone of the series resonance circuit 13 of the inductor L and capacitor C6, to be close to the resonance frequency $f_R$ of the series resonance circuit 13, as seen in FIG. 3, so that a desired high voltage $V_{O2}$ will be generated across the capacitor C6. With respect to the value $L_A$ of the inductor L2 so set as to render the starting of the high-pressure discharge lamp DL to be reliable and the flux of light to promptly rise as in the above, the capacitor C6 is set to have as least one value so as to be able to supply the rated lamp power, voltage and current to the lamp DL. While normally the capacitor C6 takes such two values $C_A$ and $C_B$ as shown in FIG. 4, a smaller value of the capacitor C6 renders the resonance current in the unlighted state of the lamp DL, that is, in no load state to be smaller, and also the current capacity of the switching elements Q2 and Q3, inductor L2 and capacitors C5 and C6 can be minimized, and it is preferable that the capacitor C6 is set to be of the smaller value. Accordingly, the capacity of the capacitor C6 is set at the smaller value $C_A$ as in FIG. 4, so as to be contributive to the minimization in size and costs in particular of the lighting drive section LO.

Further, by setting the capacity of the capacitor C6 to be $C_A$ as in the above, the switching frequency $f_1$ of the switching elements Q2 and Q3 in the lighted state of the high-pressure discharge lamp DL is caused to be set at the value lower than the resonance frequency $f_R$ of the series resonance circuit 13, and the switching frequencies $f_0$ and $f_1$ for the unlighted and lighted states of the lamp DL and the resonance frequency $f_R$ of the series resonance circuit 13 are to be set in such relationship that $f_1 < f_R < f_0$.

Figure 5:
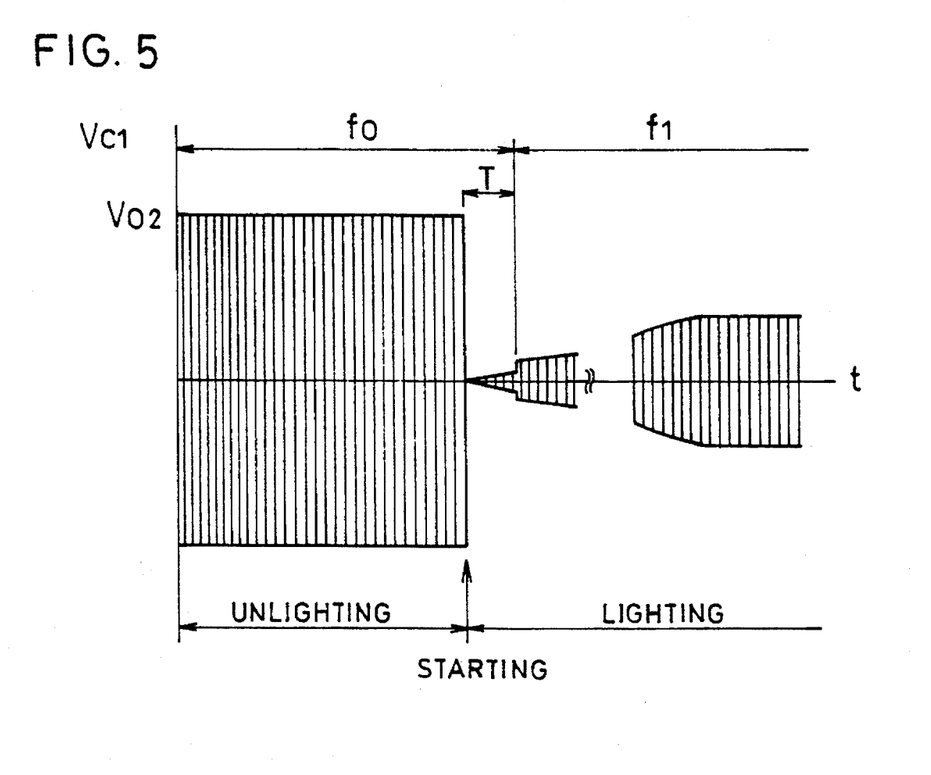
FIG. 5 is a graphical explanatory view for another embodiment of the present invention.
Figure 6:
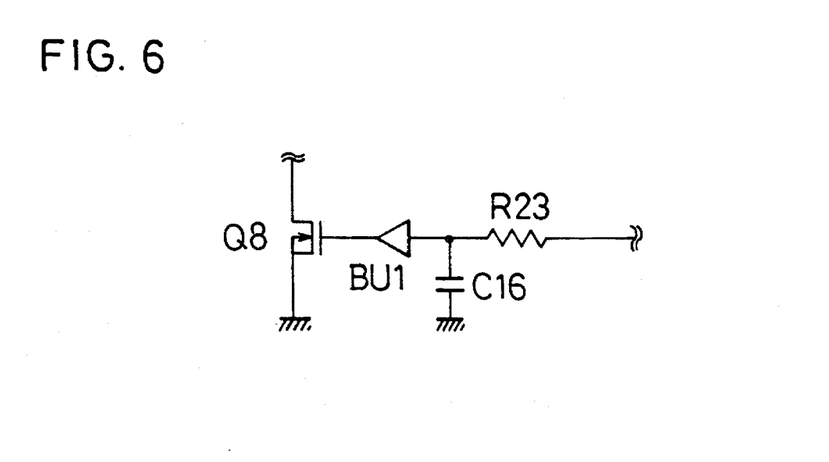
FIG. 6 is a fragmentary circuit diagram of the lighting device in the embodiment of FIG. 5.

In FIG. 5, there is shown the operation of another embodiment according to the present invention, in which the basic arrangement, operation and function are the same as those in the foregoing embodiment of FIGS. 1 and 2, and the description shall be made in the followings only with reference to characteristic features of this embodiment. In this case, the switching frequency $f_0$ of the switching elements Q2 and Q3 for turning them alternately ON and OFF is maintained for a predetermined, relatively short time T to an extent causing no influence on the rise of the flux of light after the starting of the high-pressure discharge lamp DL with the high voltage $V_{O2}$ generated across the capacitor C6, and the switching frequency is then changed over to $f_1$ after the time T elapsed. While this causes substantially no sufficient short-circuit current level of the lamp DL to be obtained during the predetermined short time T after the starting, it has been fount that, depending on the type of the high-pressure discharge lamp DL, the starting can be made smooth by rendering the switching frequency to be $f_0$ for the predetermined short time T prior to the change over of the switching frequency. At this time, as will be clear from FIG. 6 showing only a modified circuit portion in the circuit of FIG. 2, the output of the lamp current detecting means 14 is provided as delayed to the control means 12 of the switching elements.

Figure 7:
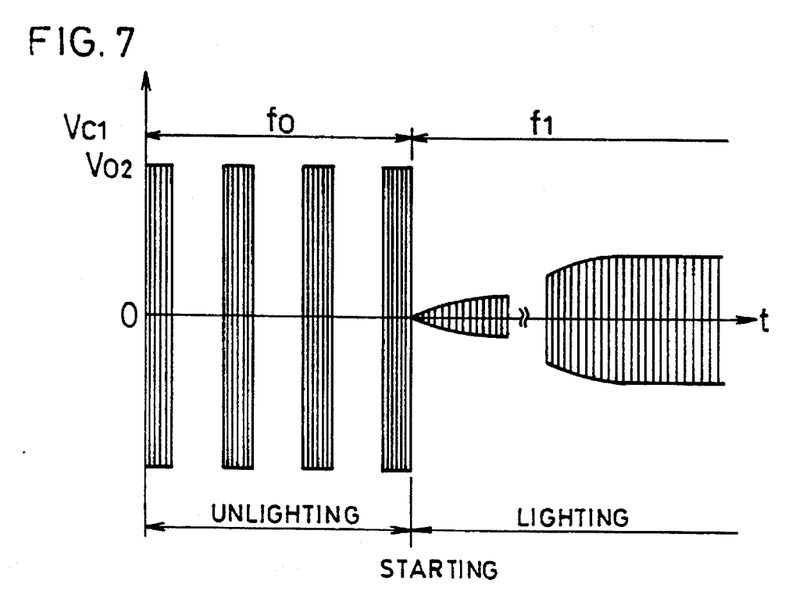
FIG. 7 is a graphical explanatory view for still another embodiment of the present invention.

Also in another embodiment of the present invention the operation of which is as shown in FIG. 7, the basic arrangement, operation and function are the same as those in the foregoing embodiment of FIGS. 1 and 2, and the description shall be limited to characteristic features of the present embodiment. In the present instance, the inverter circuit 11 is arranged to be intermittently driven during the unlighted state of the high-pressure discharge lamp DL, and this intermittent driving can be realized by intermittently turning ON and OFF at least one of the switching elements Q2 and Q3. After the starting of the lamp DL, the switching frequency of the switching elements Q2 and Q3 is momentarily changed over to $f_1$, upon which the inverter circuit 11 is made to continuously operate. When the inverter circuit 11 is actuated intermittently in the unlighted state of the lamp DL, the high voltage is generated intermittently across the capacitor C6, so that the non-load, secondary voltage $V_{O2}$ applied to the lamp DL can be restricted to be low in the effective value. With this arrangement, the effective value of the output voltage can be lowered and, even when the high-pressure discharge lamp DL is dismounted, the device can assure its safetyness.

Figure 8:
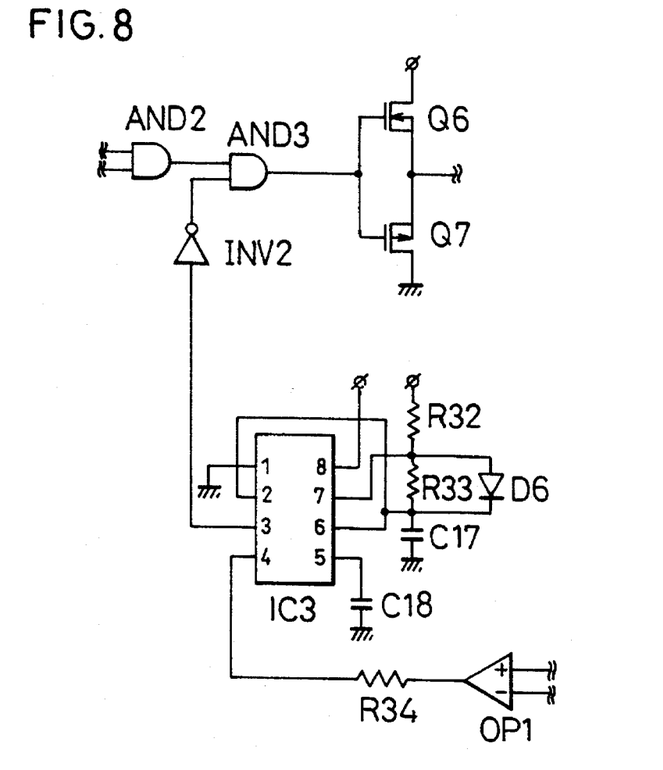
FIG. 8 is a fragmentary circuit diagram in a further embodiment according to the present invention.

In FIG. 8, there is shown another working aspect according to the present invention, which aspect can be effectively utilized in realizing the intermittent operation upon the non-load of such lighting device as shown in FIG. 7, while the basic arrangement, operation and function of this aspect are the same as those in the foregoing embodiment of FIGS. 1 and 2, and the description shall be limited only to characterizing features of this embodiment. In the present instance, the switching control circuit 12 includes such control means IC3 as a μPD555 manufactured by a firm Nippon Electric Corporation (NEC). This control means IC3 receives as an input the output from the ON/OFF state detecting circuit 14, and provides at #3 pin, as an output only in the unlighted state, H or L signal of duty at a frequency determined by resistors R32 and R33 and a capacitor C17. When the output signal at #3 pin is "H", the ON/OFF signal for the switching element Q3 is interrupted, the switching element Q3 is thereby retained in OFF, and the lighting drive section LO is placed in quiescent state. When the output at #3 pin is "L" signal, on the other hand, the ON/OFF signal for the switching element Q3 is transmitted, and the lighting drive section LO is put in operating state in response to the ON/OFF operation of the switching element Q3.

Figure 9:
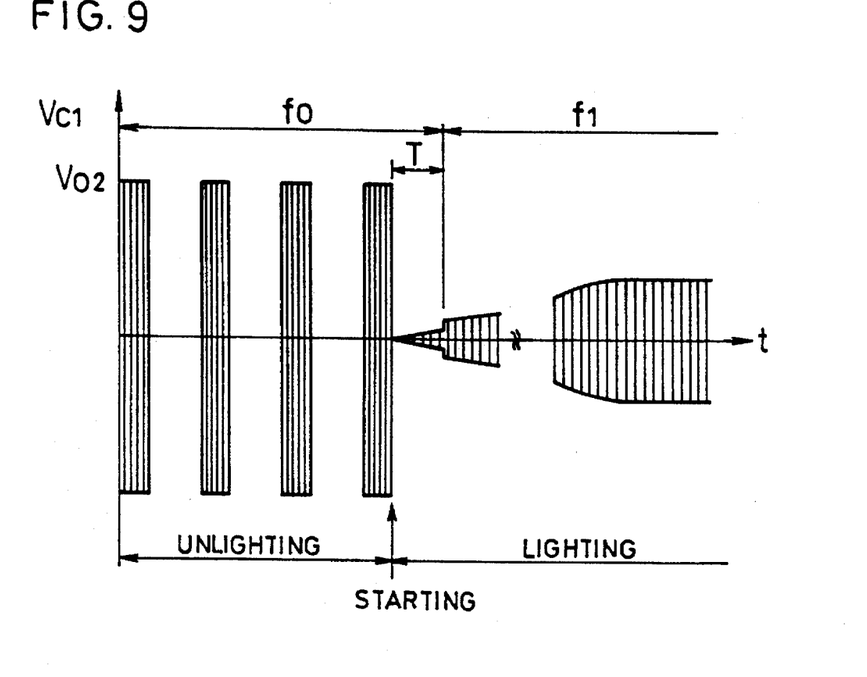
FIG. 9 is a graphical explanatory view for another embodiment of the present invention.

In FIG. 9, another embodiment according to the present invention is shown, in which the basic arrangement, operation and function are the same as those in the foregoing embodiment of FIGS. 1 and 2, and the description shall be limited only to the characterizing features of this embodiment. In the present instance, the switching frequency of the switching elements Q2 and Q3 upon starting the high-pressure discharge lamp DL is made $f_0$ while the inverter circuit 11 is driven intermittently, then the switching frequency $f_0$ is maintained for the relatively short, predetermined time T after the starting to an extent causing no influence on the rise of the flux of light while driving the inverter circuit 11 continuously and, after elapsing of the predetermined short time T, the switching frequency is changed over to $f_1$. In changing over the switching frequency of the switching elements Q2 and Q3 from $f_0$ to $f_1$ with the intermittent drive of the inverter circuit 11 changed over to its continuous drive at the time when the high-pressure discharge lamp DL is made by the high voltage pulse to cause the dielectric breakdown to start the discharge, it is necessary to take into account such respect as follows. That is, while the high-pressure discharge lamp DL shifts, after causing the dielectric breakdown, from the glow discharge to the arc discharge to reach a stable lighting state, the interior plasma of the high-pressure discharge lamp DL immediately after the occurrence of the dielectric breakdown in general is physically extremely unstable so that the glow discharge does not shift to the arc discharge but returns again to the unlighted state. More specifically, an abrupt change-over of the switching frequency of the switching elements Q2 and Q3 from $f_0$ to $f_1$ upon the starting of the lamp DL, the frequency $f_1$ is lower than the resonance frequency $f_R$ so that, as the lamp DL is lighted OFF again, the inverter circuit 1! is caused to actuate at an advanced phase mode of operating at the lower frequency (i.e., the capacitive oscillation range) $f_1$ than the resonance frequency $f_R$ of the series resonance circuit 13, and there arises a risk that a stress imposed to the switching elements Q2 and Q3 or the constituent elements of the series resonance circuit 13 is apt to become larger, so as to cause the switching elements Q2 and Q3 damaged by an excessive current made to flow through them.

In the present embodiment, the switching frequency $f_0$ is maintained for the predetermined, relatively short time T after the starting and prior to the change over from $f_0$ to $f_1$ of the switching frequency, and any stress can be thereby prevented from being imposed to the switching elements or the constituent elements of the series resonance circuit 13. In this respect, the retention of the switching frequency at $f_0$ for the predetermined short time T prior to the change-over of the switching frequency from $f_0$ to $f_1$ will be useful with respect to the high-pressure discharge lamp DL which can be reliably started. Further, by the intermittent drive of the inverter circuit 11 ensures that the high voltage is generated intermittently across the capacitor C6, while the effective value of the non-load secondary voltage $V_{o2}$ applied to the lamp DL can be lowered so as to be able to improve the safetyness.

Figure 10:
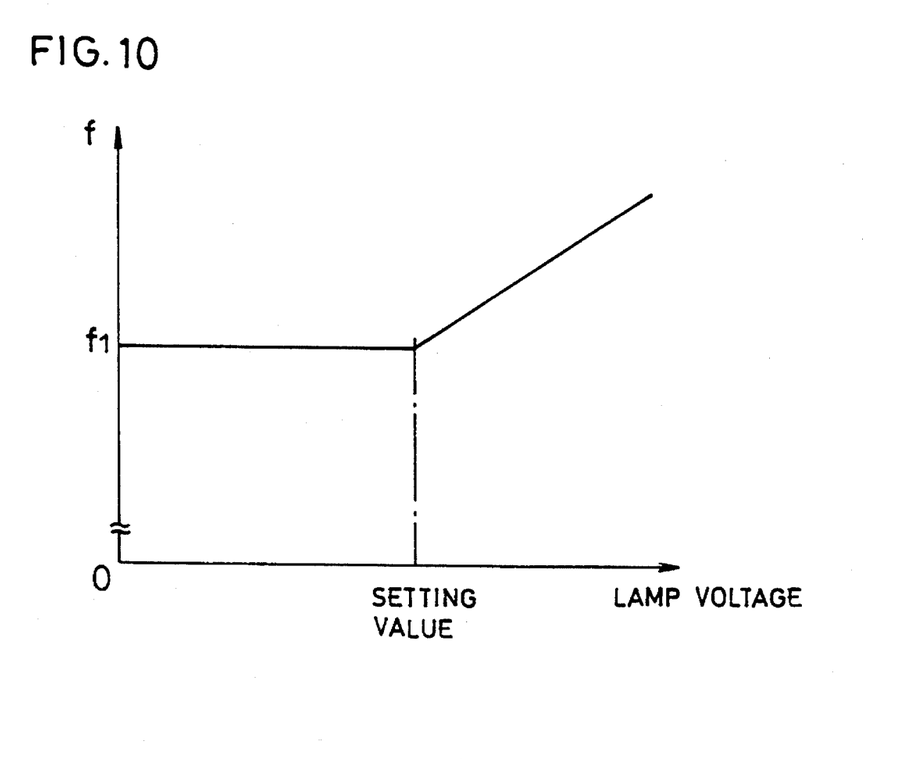
FIG. 10 is an operational explanatory view for another embodiment of the present invention.
Figure 11:
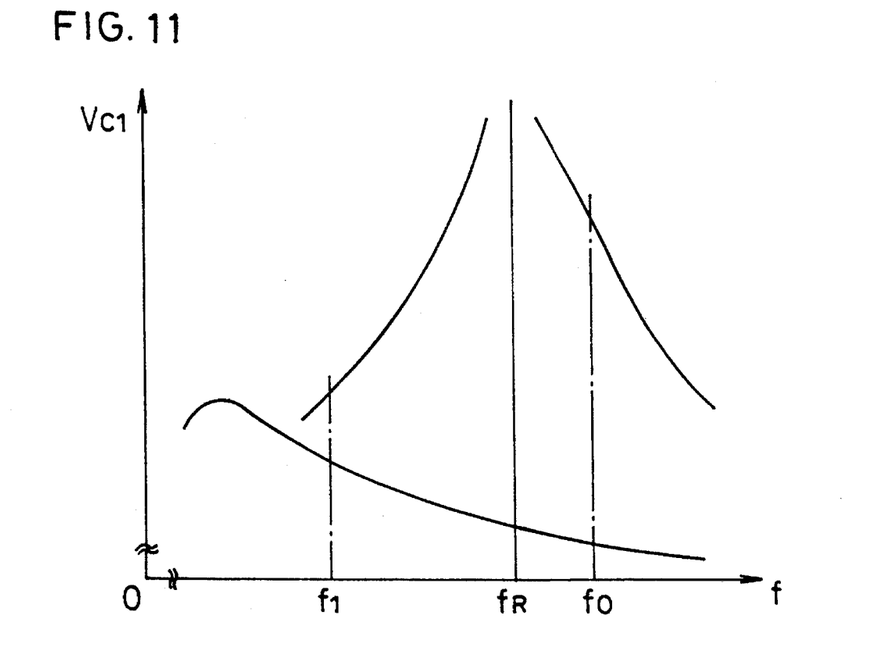
FIG. 11 is an explanatory graph for a reduction in the lamp current in the embodiment of FIG. 10.

Also in another embodiment shown in FIGS. 10 and 11, too, the basic arrangement, operation and function are the same as those in the foregoing embodiment of FIGS. 1 and 2, but the following description shall be limited to the characterizing features of this embodiment. In the present instance, the control is so made that, when the lamp voltage has risen above a set value after a shift of the high-pressure discharge lamp DL substantially to the rated lighting, the switching frequency of the switching elements Q2 and Q3 is varied to be higher than $f_1$ in particular, as shown in FIG. 10. More specifically, while the high-pressure discharge lamp DL which is generally high in the lamp voltage is relatively small in the lamp current, and the arc discharge is thin. In horizontal lighting state, in particular, there arises a problem that the arc approaches upper side tube wall due to the buoyancy of the arc itself, the temperature at this part is apt to locally rise, and eventually the temperature at the tube wall rises locally abnormally. In such high-pressure discharge lamp DL, it is made possible to prevent the tube wall from locally abnormally rising, by means of a lowering of average temperature of the arc discharge with the switching frequency of the switching elements Q2 and Q3 varied to a value higher than $f_1$ for reducing the current to be smaller, after the shift of the lamp substantially to the rated lighting and when the lamp voltage has risen above the set value.

With respect to the reason why the lamp current can be made smaller in the event when the switching frequency of the switching elements Q2 and Q3 is varied towards a higher value than $f_1$ as in the foregoings, the description shall be made with reference also to FIG. 11. Now, so long as the high-pressure discharge lamp DL is in the unlighted state, the device is in the non-load state, the resonance frequency of the series resonance circuit 13 is at an intermediate value between the switching frequency $f_1$ of the switching elements Q2 and Q3 in the lighted state of the lamp DL and the switching frequency $f_0$ of the elements in the unlighted state of the lamp. Once the lamp DL has started and the substantial rated state is reached, on the other hand, the impedance of the lamp DL is connected to the series resonance circuit 13. The impedance of the lamp DL is connected across the capacitor C6, because of which the resonance frequency of the series resonance circuit 13 is lowered to be below the switching frequency $f_1$ of the switching elements Q2 and Q3 upon the lighting, a variation of the switching frequency of the switching elements Q2 and Q3 towards the higher value than $f_1$ causes the voltage generated across the capacitor C1 to be lowered, and the lamp current is eventually decreased to be smaller.

In still another embodiment according to the present invention, the device is so arranged that the switching frequency of the switching elements Q2 and Q3 is momentarily changed over from $f_1$ to $f_0$ in an event when a flicker-off has taken place during the stationary lighting state of the high-pressure discharge lamp DL. In an event when the switching frequency of the switching elements Q2 and Q3 is maintained at $f_1$ in the state where the lamp DL has flickered off, the inverter circuit 11 is caused to be operated in the capacitive oscillation range, i.e., in the advanced phase mode, since the switching frequencies $f_1$ and $f_0$ of the switching elements during the lighted and unlighted states of the lamp DL and the resonance frequency $f_R$ of the series resonance circuit 13 are set to be $f_1 < f_R < f_0$ as has been referred to in the above, accompanying which a rush current is caused to flow to the switching elements Q2 and Q3 and the stress imposed on the elements is enlarged.

In the present embodiment, therefore, the switching frequency of the switching elements Q2 and Q3 is momentarily changed over from $f_1$ to $f_0$ in the event when the flicker-off has taken place in the high-pressure discharge lamp DL in the stationary lighting, and the stress imposed on the switching elements Q2 and Q3 is reduced thereby. At this time, an instantaneous voltage application to the lamp DL is performed, and it is advantageously possible to shorten required time for re-starting the lamp.

In a further embodiment according to the present invention, the device is so arranged that the control signals applied to the switching elements Q2 and Q3 are instantaneously interrupted upon the flicker-off of the high-pressure discharge lamp DL in the stationary lighted state. More specifically, the retention of the switching frequency $f_1$ of the switching elements Q2 and Q3 in the state where the high-pressure discharge lamp DL has flickered off the foregoing relationship $f_1 < f_R < f_0$ of the switching frequencies $f_1$ and $f_0$ of the elements in the lighted and unlighted states of the lamp DL and the resonance frequency $f_R$ of the series resonance circuit 13 causes the inverter circuit 11 to operate in the capacitive oscillation range, that is, in the advanced phase mode, accompanying which the stress imposed on the switching elements Q2 and Q3 is enlarged. When at this time the required time for changing over the switching frequency of the elements involves a delay, a stress is caused to be imposed on the switching elements Q2 and Q3. Thus, in the present instance, the arrangement is so made that the control signals applied to the switching elements Q2 and Q3 are interrupted during the period in which the lamp DL in the stationary lighted state involves the risk of being flickered off and being operated in the advanced phase mode.

Figure 12:
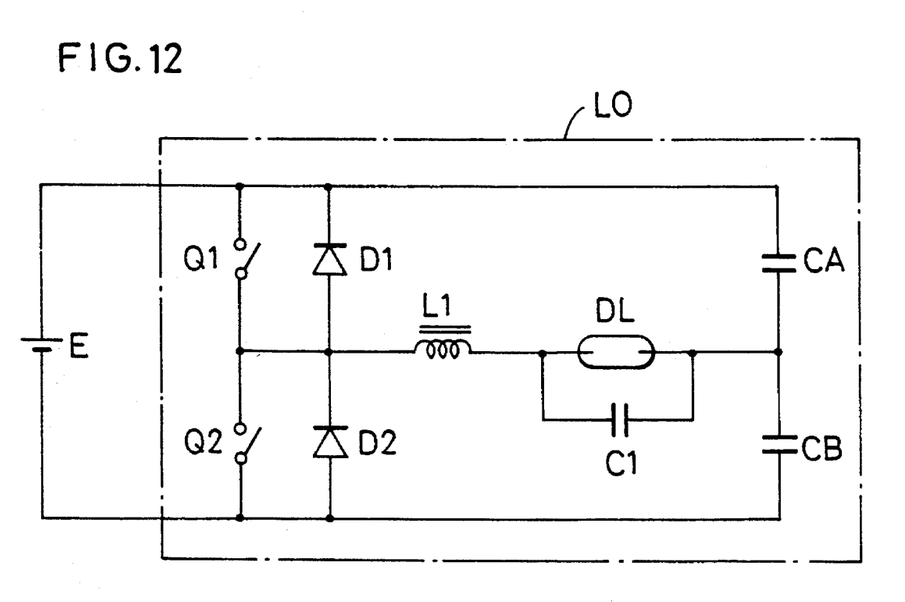
FIG. 12 is a circuit diagram showing still another embodiment of the present invention.
Figure 13:
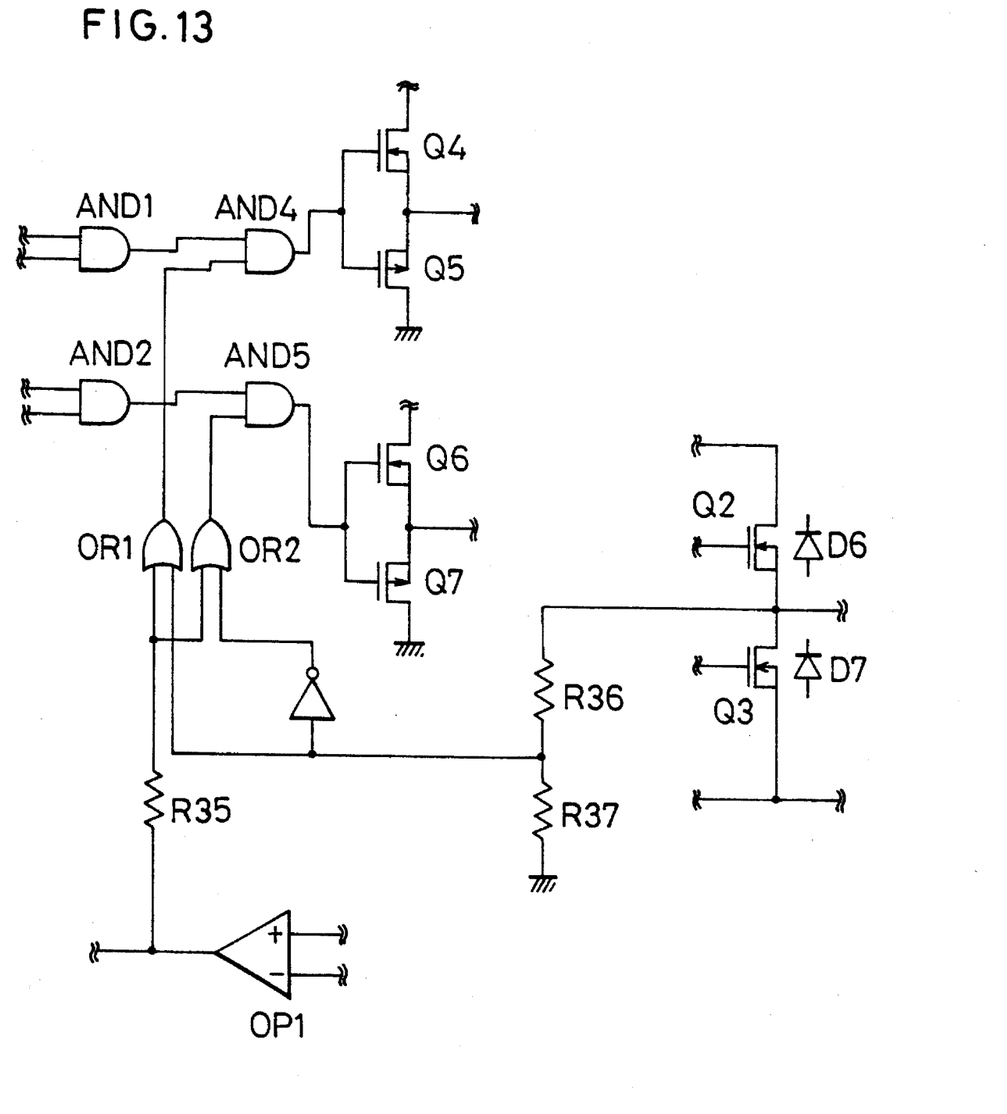
FIG. 13 is a fragmentary circuit diagram of the embodiment in FIG. 12.
Figure 14A:
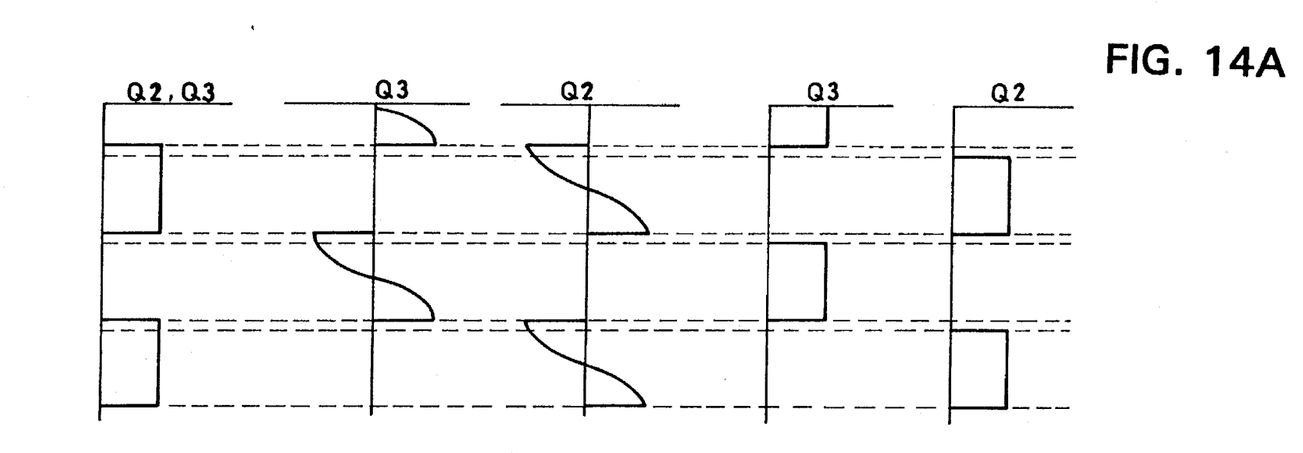
FIGS. 14A and 14B are current waveform diagrams showing the operation of the embodiment in FIG. 12.
Figure 14B:
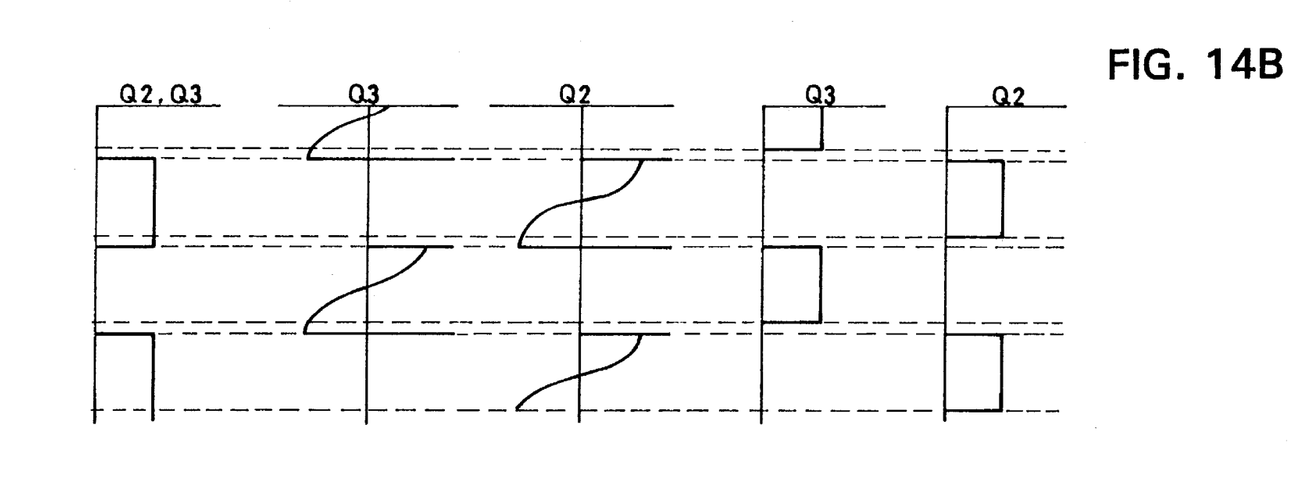

Describing this more specifically by references also to FIGS. 12 to 14, the control signals for the switching elements Q2 and Q3 and their drain currents and neutral potential are shown in FIGS. 14A and 14B. As will be clear from the drawings, there arises a difference in the neutral potential of the switching elements Q2 and Q3 immediately before the rise of the control signals to the elements between the delayed phase mode and the advanced phase mode. In the following Table, the neutral potential is presented.

TABLE

| Immediately Before Rising of Control Signal for Q2 | | Immediately Before Rising of Control Signal for Q3 | |
| --- | --- | --- | --- |
| Delayed Phase | Advanced Phase | Delayed Phase | Advanced Phase |
| H | L | L | H |

Figure 15:
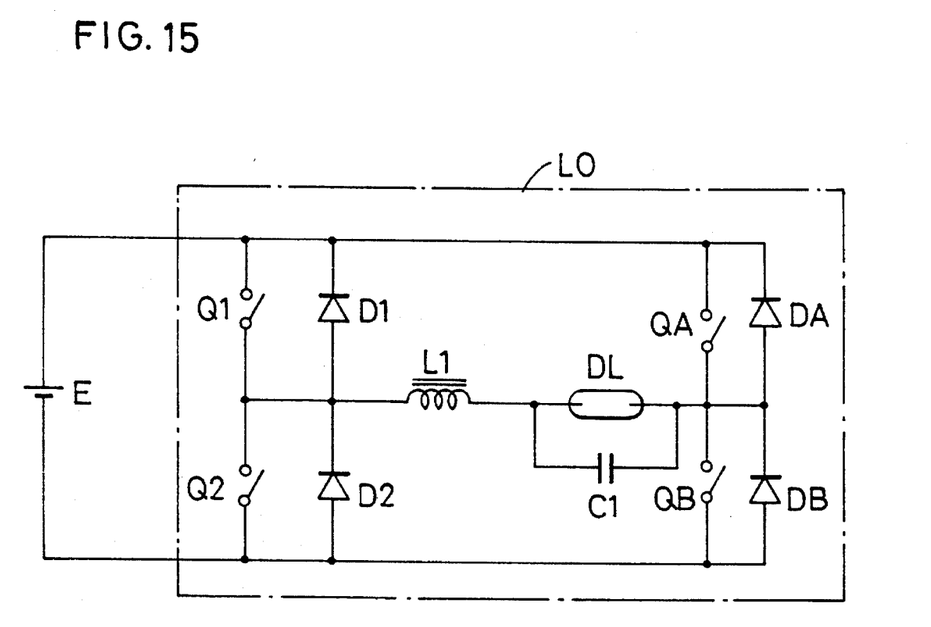
FIG. 15 shows in a circuit diagram another working aspect of the embodiment in FIG. 12.

As will be clear from the above Table, the control signals for the switching element Q2 reach the element when the neutral potential of both switching elements Q2 and Q3 is H, but are interrupted when their neutral potential is L, whereas the control signals for the switching element Q3 are provided to the element when the neutral potential of both elements Q2 and Q3 is L but are interrupted when their neutral potential is H. Thus, with the above operation performed, the change-over of the switching frequency of the switching elements is made to stop when the device operation is put in the advanced phase mode, and the stress to the switching elements Q2 and Q3 is eliminated. The operation of the present embodiment can be realized by such circuit arrangement as in FIG. 13 which showing only modified portions of the circuit shown in FIG. 2. As an applicable circuit of the present embodiment, such one of a full-bridge type as shown in FIG. 15 in contrast to the one of the half-bridge type as in FIG. 12 may be employed.

What is claimed is:

1. A high-pressure discharge lamp lighting device comprising a DC power source, an inverter circuit including at least a pair of switching elements connected to said DC power source for converting a DC signal from said DC power source into an AC signal by turning ON and OFF said switching elements at selectable switching frequencies, a series resonance circuit connected to said inverter circuit and including an inductance element and a capacitor having a resonance frequency $f_R$, a high-pressure discharge lamp connected in parallel with said capacitor, means for detecting whether said high-pressure discharge lamp is in a lighted state or a non-lighted, non-load state, and control means, coupled to said means for detecting, for changing the switching frequency of said switching elements in response to detection of the lighted state and non-load state of said high-pressure discharge lamp wherein the switching frequency of said inverter circuit in the non-load state of said high-pressure discharge lamp is set by said control means to a frequency $f_0$ higher than but close to the resonance frequency $f_R$ while said high-pressure discharge lamp is being started into the lighted state with a high voltage generated across said capacitor, and the switching frequency of said inverter circuit is set by said control means to a frequency $f_1$ lower than the resonance frequency $f_R$ and outside a frequency range in which an unstable arc discharge in said high-pressure discharge lamp due to acoustic resonance occurs while the lighted state of said high-pressure discharge lamp is being maintained with a voltage generated across said capacitor.

2. The device according to claim 1 wherein said control means maintains the switching frequency $f_0$ close to the resonance frequency $f_R$ for a predetermined time immediately after starting of said high-pressure discharge lamp, and changes the switching frequency $f_0$ to the switching frequency $f_1$ after a predetermined time has elapsed.

3. The device according to claim 1 wherein said control means actuates said inverter circuit intermittently until said high-pressure discharge lamp starts.

4. The device according to claim 3 wherein said control means changes the switching frequency of said inverter circuit to the frequency $f_1$ momentarily, after said high-pressure discharge lamp starts, while continuously actuating said inverter circuit.

5. The device according to claim 3 wherein said control means is arranged for continuously actuating said inverter circuit simultaneously with said starting of said high-pressure discharge lamp, and maintaining the switching frequency of the inverter circuit at said switching frequency $f_0$ close to said resonance frequency $f_R$ for said predetermined time immediately after the starting of the high-pressure discharge lamp.

6. The device according to claim 1 wherein said control means controls the switching frequency of said inverter circuit to be larger than the frequency $f_1$ for preventing acoustic resonance when a lamp voltage across said high-pressure discharge lamp has risen above a predetermined value after said high-pressure discharge lamp has shifted to a substantially stationary lighted state from the non-load state.

7. The device according to claim 1 wherein the switching frequency of said inverter circuit is momentarily shifted to $f_0$ when said high, pressure discharge lamp flickers into the non-load state from the lamp lighted state.

8. The device according to claim 1 including means for detecting a capacitive oscillation from a potential at a junction point between said pair of switching elements when said high-pressure discharge lamp is subjected to the capacitive oscillation upon starting, for interrupting a control signal applied from said control means to said switching elements.

9. A high-pressure discharge lamp lighting device comprising:

a DC power source for generating a DC voltage signal;

an inverter circuit connected to said DC power source for converting the DC voltage signal into an AC voltage signal and including at least a pair of switching elements;

a series resonance circuit, connected to said inverter circuit, having a resonance frequency $f_R$, and including an inductance element and a capacitor;

a high-pressure discharge lamp connected in parallel with said capacitor;

detecting means for detecting whether said high-pressure discharge lamp is in a lighted state or a non-lighted state;

control means for generating a control signal to operate said inverter at a first frequency $f_0$ close to and higher than the resonance frequency $f_R$ during starting of said high-pressure discharge lamp from the non-lighted state to the lighted state, and for operating said inverter at a second frequency $f_1$ when said high-pressure discharge lamp is in the lighted state, the second frequency $f_1$ being outside a frequency range in which acoustic resonance occurs and lower than the resonance frequency $f_R$.

10. The device according to claim 9 comprising means for detecting a capacitive oscillation from a potential at a junction point between said pair of switching elements when said high-pressure discharge lamp is in the lighted state and for interrupting the control signal to said inverter circuit upon detection of a capacitive oscillation.

* * * * *